United States Patent
Gloeckner et al.

(10) Patent No.: US 12,467,235 B2
(45) Date of Patent: Nov. 11, 2025

(54) METHOD AND CONTROL DEVICE FOR OPERATING A SELF-DRIVING WORKING MACHINE

(71) Applicant: ZF FRIEDRICHSHAFEN AG, Friedrichshafen (DE)

(72) Inventors: Rico Gloeckner, Pocking (DE); Migen Bebeti, Munich (DE)

(73) Assignee: ZF FRIEDRICHSHAFEN AG, Friedrichshafen (DE)

( * ) Notice: Subject to any disclaimer, the term of this patent is extended or adjusted under 35 U.S.C. 154(b) by 226 days.

(21) Appl. No.: 18/249,973

(22) PCT Filed: Oct. 21, 2021

(86) PCT No.: PCT/EP2021/079154
§ 371 (c)(1),
(2) Date: Apr. 21, 2023

(87) PCT Pub. No.: WO2022/090041
PCT Pub. Date: May 5, 2022

(65) Prior Publication Data
US 2023/0392350 A1    Dec. 7, 2023

(30) Foreign Application Priority Data

Oct. 30, 2020 (DE) ............. 10 2020 213 674.2

(51) Int. Cl.
*E02F 9/22* (2006.01)
*E02F 9/20* (2006.01)

(52) U.S. Cl.
CPC ............. *E02F 9/226* (2013.01); *E02F 9/205* (2013.01)

(58) Field of Classification Search
CPC .......... E02F 9/226; E02F 9/205; B60K 28/14; B60W 10/04; B60W 10/30; B60W 30/04; B60W 2030/041; B60W 2040/1315
USPC .......................................... 701/50
See application file for complete search history.

(56) References Cited

U.S. PATENT DOCUMENTS

| 9,764,734 | B1* | 9/2017 | Brown | B60W 30/143 |
| 2005/0149240 | A1* | 7/2005 | Tseng | B60R 21/0133 |
| | | | | 280/5.502 |
| 2014/0207352 | A1* | 7/2014 | Rossi | B60T 7/22 |
| | | | | 701/70 |
| 2015/0225927 | A1* | 8/2015 | Hoshino | F02D 29/04 |
| | | | | 701/50 |

(Continued)

FOREIGN PATENT DOCUMENTS

| EP | 2578757 A1 | 4/2013 |
| EP | 3571911 A1 | 11/2019 |

*Primary Examiner* — Krishnan Ramesh
(74) *Attorney, Agent, or Firm* — LEYDIG, VOIT & MAYER, LTD.

(57) ABSTRACT

A method for operating a self-driving working machine including determining an operating variable of a working device of the self-driving working machine and determining a longitudinal dynamics driving variable of the self-driving working machine. The method also includes checking whether a hazardous state for stability of the self-driving working machine can occur based on the determined operating variable and the determined longitudinal dynamics driving variable The method also includes intervening in longitudinal dynamics of the self-driving working machine depending on a check result based on the checking step.

17 Claims, 2 Drawing Sheets

(56) References Cited

U.S. PATENT DOCUMENTS

| | | |
|---|---|---|
| 2017/0234119 A1 | 8/2017 | Allen et al. |
| 2020/0055511 A1* | 2/2020 | Schwagmeyer .......... B60T 7/12 |
| 2020/0156633 A1* | 5/2020 | Stephan .............. B60W 30/165 |
| 2020/0172087 A1* | 6/2020 | Shur .................... E02F 9/2025 |

* cited by examiner

METHOD AND CONTROL DEVICE FOR OPERATING A SELF-DRIVING WORKING MACHINE

CROSS REFERENCE TO RELATED APPLICATIONS

This application is a U.S. National Phase application under 35 U.S.C. § 371 of International Application No. PCT/EP2021/079154, filed on Oct. 21, 2021, and claims benefit to German Patent Application No. DE 10 2020 213 674.2, filed on Oct. 30, 2020. The International Application was published in German on May 5, 2022 as WO 2022/090041 A1 under PCT Article 21(2).

FIELD

Technical Field

The invention relates to a method and a control device for operating a self-driving working machine. The invention also relates to a self-driving machine.

Background

Self-driving working machines can, for example, be used on a construction site for various tasks. During the operation of a self-driving working machine, for example in civil engineering, accidents can still occur despite already existing safety measures due to a lack of stability of the self-driving working machine.

SUMMARY

In an embodiment, the present disclosure provides a method for operating a self-driving working machine comprising determining an operating variable of a working device of the self-driving working machine and determining a longitudinal dynamics driving variable of the self-driving working machine. The method also comprises checking whether a hazardous state for stability of the self-driving working machine can occur based on the determined operating variable and the determined longitudinal dynamics driving variable The method also comprises intervening in longitudinal dynamics of the self-driving working machine depending on a check result based on the checking step.

BRIEF DESCRIPTION OF THE DRAWINGS

Subject matter of the present disclosure will be described in even greater detail below based on the exemplary figures. All features described and/or illustrated herein can be used alone or combined in different combinations. The features and advantages of various embodiments will become apparent by reading the following detailed description with reference to the attached drawings, which illustrate the following.

DETAILED DESCRIPTION

Figure 1:
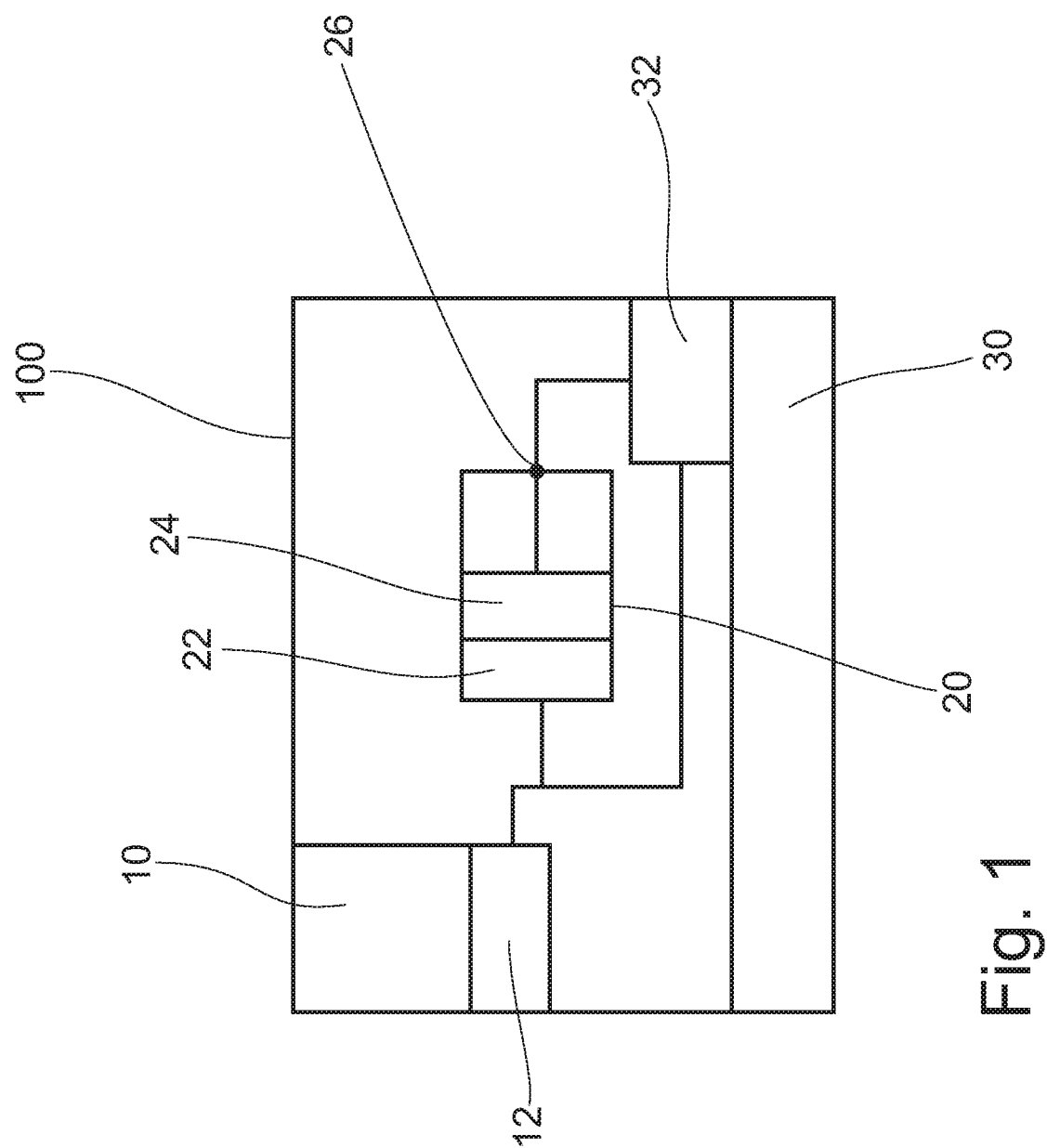
FIG. 1 illustrates a schematic diagram describing a self-driving working machine according to an embodiment of the invention.

In an embodiment, the present invention provides a method for operating a self-driving working machine. The self-driving working machine may be a vehicle or a machine which may be designed to perform at least one work task. The self-driving working machine may therefore be a vehicle or a machine which is primarily intended for carrying out at least one work task. The self-driving working machine is therefore not a vehicle or machine that is primarily intended for transporting people. However, the self-driving working machine may be designed to transport things. The method can thus also be carried out for executing at least one work task with the working machine.

According to an embodiment, the self-driving working machine may be a construction machine. The construction machine may have a tool for performing at least one work task. The self-driving working machine can be, for example, a wheeled loader. The tool can be, for example, a bucket. A working device of the machine may comprise the tool or the bucket.

The method has as a step the determination of an operating variable of a working device of the self-driving working machine. The working device may be located on the self-driving working machine. The working device may be located at the front or rear of the self-driving working machine. The working device can be operated with a variable or fixed load. The working device may be arranged fixedly or movably on the working vehicle. The operating variable of the working device may describe a current operating parameter or a current operating state of the working device. The operating variable of the working device can be a static or dynamic operating variable of the working device. The operating variable may have a static operating state.

According to an embodiment, the step of determining the operating variable of the working device may be based on the detection of the operating variable by a sensor. The operating variable of the working device can be recorded directly by sensors or determined based on a sensor-detected variable.

The method has as a further step the determination of a longitudinal dynamics driving variable of the self-driving working machine. The longitudinal dynamics driving variable may be a driving dynamics variable relating to the longitudinal movement of the self-driving working machine. The longitudinal dynamics driving variable or the driving dynamics variable may be, for example, a drive variable, an acceleration variable or a braking variable.

The method has as a further step a check as to whether a hazardous state for the stability of the self-driving working machine can arise based on the determined operating variable and the determined longitudinal dynamics driving variable. Thus, a critical condition for the stability of the self-driving working machine can be detected.

The checking step can be based on determining information about a location of a center of gravity of the self-driving working machine. The hazardous state for the stability of the self-driving working machine may be a current or future operating state of the self-driving working machine in which the self-driving working machine tilts or will tilt. The checking step may therefore include the determination of a current hazardous state or a prediction of a future hazardous state for the stability of the self-driving working machine. As a check result of the checking step, it may therefore be that the hazardous state exists or will exist.

According to an embodiment, the checking step may include a comparison of the determined information about the location of the center of gravity of the self-driving working machine with at least one item of limit information about the location of the center of gravity of the self-driving working machine. If a limit values is exceeded, it may then be available as a test result that, based on the determined information about the position of the centre of gravity of the self-driving working machine, the hazardous state for the stability of the self-driving working machine has arisen or will arise.

The method has as a further step an intervention in the longitudinal dynamics of the self-driving working machine depending on a check result based on the checking step. The method may thus include as a further step the braking or acceleration of the self-driving working machine in order to prevent or eliminate the hazardous state for the stability of the self-driving working machine. The intervention in the longitudinal dynamics of the self-driving working machine may include the control of a drive motor for the longitudinal dynamics drive of the self-driving working machine or a drive train of the self-driving working machine. According to an embodiment, the intervention may thus include the minimization of the longitudinal dynamics or driving dynamics. The aggressiveness of the longitudinal dynamics or driving dynamics can thus be reduced and thus a risk to stability can be avoided, for example when reversing the self-driving working machine. According to an embodiment, the intervention can also be carried out depending on a load acting on the working device.

The method may therefore include as a further step the monitoring of the tilting of the self-driving working machine, wherein the monitoring step may include the continuous determination of the hazardous state or the tilting state.

According to an embodiment, the step of determining an operating variable of the working device includes the determination of a task hydraulic request requested by a driver to perform a task with the working device. The task hydraulic request can be requested directly or indirectly by the driver. The task hydraulic request can be a volume flow request for the working hydraulics. The volume flow request can also be requested directly or indirectly by the driver. The step of determining the operating variable may include determining a maximum task hydraulic request requested by a driver or a task hydraulic request exceeding a predefined threshold.

According to an embodiment, the step of determining an operating variable of the working device includes the determination of a task hydraulic request communicated by an automatic working system for automatically performing a task with the working device. The step of determining the operating variable may therefore also include the determination of a maximum task hydraulic request or a task hydraulic request exceeding a predefined threshold communicated by the automatic working system. Furthermore, the step of determining an operating variable of the working device may already include a query as to whether an automatic working system is activated.

According to an embodiment, the step of determining an operating variable of the working device includes the determination of a load acting on the working device. The load acting on the working device may result from a weight force acting on the working device. For example, the working device may carry an object or material, resulting in the load acting on the working device. Alternatively or additionally, the load acting on the working device may result from the performance of a working task by the working device, for example pulling or pushing with the working device. If the working device has a bucket, a load state or a current load of the bucket can be determined in a further step, for example. The determination of a load acting on the working device can be carried out based on the determination of the output torque of an electric motor driving the working device. Alternatively or additionally, the determination of a load acting on the working device can be carried out based on the determination of an adjustment angle of a hydraulic pump hydraulically driving the working device. The hydraulic pump can be designed as a variable displacement pump or as a gear pump.

According to an embodiment, the step of determining an operating variable of the working device includes the determination of a working pressure in a working hydraulic system of the working device. Determining the working pressure can also be performed based on determining the output torque of an electric motor or an adjustment angle of a hydraulic pump.

According to an embodiment, the step of determining an operating variable of the working device includes the determination of spatial location information for the working device. The spatial location information may contain information about at least one of an alignment or orientation and a position of the working device. If the working device has a bucket, the determination of spatial location information may include the determination of a position of the bucket, for example a lifting height of the bucket. If the working device has a lifting arm, the determination of spatial location information may include the determination of a position of the lifting arm, for example a lifting height of the bucket.

The working device may have a lifting frame. The lifting frame may have a lifting structure. The lifting frame or the lifting structure may have at least one lifting arm. According to an embodiment, the step of determining an operating variable of the working device may include the determination of a working variable of the lifting kinematics of the lifting frame or the lifting structure. The working variable of the lifting kinematics may comprise an angle in a lifting frame joint or a length of an extendable lifting frame component.

According to an embodiment of the method, this includes as a further step the determination of a steering variable. The steering variable may comprise a steering angle or an articulation angle of the self-driving working machine. The checking step can be performed based on the determined steering information. A risk to stability when accelerating the working machine can thus also be avoided when cornering.

According to an embodiment, the step of determining a longitudinal dynamics driving variable includes the determination of a drive request requested by a driver for longitudinal dynamics driving of the self-driving working machine. The drive request may be a speed request or an acceleration request. Further, the drive request may be any request for operating a drive train of the self-driving working machine, such as a request to activate or deactivate drive units of the self-driving working machine or a request to operate a gearbox of the self-driving working machine.

According to an embodiment, the step of determining a longitudinal dynamics driving variable includes the determination of a change of direction of travel requested by a driver to change a direction of travel of the self-driving working machine. Determining the change of direction of travel requested by the driver may include the determination of requested reversing of the self-driving working machine.

According to an embodiment, the checking step includes a check as to whether a tilting state of the self-driving working machine can arise. For example, it can be checked whether the current center of gravity of the self-driving working machine is within the limits of a tilting edge polygon, for example, a stability triangle or stability quadrilateral formed in the self-driving working machine. As a check result of the checking step, therefore, it may also be that a tilting state exists or will exist.

According to an embodiment, the method includes as a further step the determination of information about a spatial orientation of the self-driving working machine. The determination of information about the spatial orientation of the self-driving working machine may include the determination of information about the inclination of the self-driving working machine, for example the longitudinal inclination or transverse inclination of the self-driving working machine. The checking step can be performed based on the determined information. The checking step may include a comparison of a current spatial orientation or inclination with a predefined limit value for spatial orientation or inclination. The check result may then be that the predefined limit value has been exceeded. The self-driving working machine may have inclination sensors, wherein the step of determining information about a spatial orientation of the self-driving working machine can be carried out based on measurement data of the inclination sensors.

According to an embodiment, the step of intervening in the longitudinal dynamics includes limiting a drive request that can be requested by a driver to drive the self-driving working machine. The step of intervening in the longitudinal dynamics may include limiting a speed request or an acceleration request. Thus, the longitudinal dynamic aggressiveness of the self-driving working machine that can be requested by the operator can be limited in order to ensure the stability safety of the self-driving working machine and to avoid tilting of the self-driving working machine.

According to an embodiment, the method includes as a further step the implementation of a maximum task operating variable requested by a driver for performing a task with the working device. The implementation of the maximum task operating variable requested by the driver may be based on the fact that the maximum task operating variable that can be requested by the driver is not reduced or limited. The implementation of the maximum task operating variable requested by the driver may involve the control of a drive motor for the working device or the working hydraulics. By intervening in the longitudinal dynamics or by limiting the drive request that can be requested by the driver, the step of implementing the maximum task operating variable requested by the driver can be made possible. Despite the implementation of the maximum task operating variable requested by the driver, the stability of the self-driving working machine can be ensured and thus tilting of the self-driving working machine can be avoided.

According to an embodiment, the method includes as a further step the implementation of driver-triggered maximum braking of the self-driving working machine to trigger an emergency braking process. The step of intervening in the longitudinal dynamics can be carried out independently of continuing to maintain maximum braking of the self-driving working machine that can be triggered by the driver in order to trigger an emergency braking process. Thus, for example, emergency braking during the operation of the self-driving working machine can be carried out independently of a limitation of the drive request that can be requested by the driver. The operational safety of the self-driving working machine can also be increased in this way. According to an embodiment, the implementation of the maximum braking of the self-driving working machine triggered by the driver can be carried out depending on a load acting on the working device. In this way, even during emergency braking, a risk to the stability of the self-driving working machine can be avoided.

According to an embodiment, the method can be carried out automatically, wherein the driver can trigger the execution of the method. The triggering can be based on a command from the driver, such as an input via an interface. The interface may be in the form of a display or a control element.

An embodiment of the invention relates to a control device for operating a self-driving working machine. The control device may be set up to perform the method according to the preceding aspect. The control device may comprise at least one unit or interface for performing at least one of the steps described for the method.

The control device comprises an evaluation unit for determining an operating variable of a working device of the self-driving working machine and for determining a longitudinal dynamics driving variable of the self-driving working machine. The control unit comprises a checking unit for checking whether a hazardous state for the stability of the self-driving working machine can arise based on the determined operating variable and the determined longitudinal dynamics driving variable. The checking unit is set up to provide a check result based on the check. The control unit has an interface for the output of a control signal, with which an intervention into the longitudinal dynamics of the self-driving working machine can be carried out depending on the check result that can be provided by the checking unit.

An embodiment of the invention relates to a self-driving working machine with a working device and a control device according to the preceding aspect for operating the self-driving working machine. The working device may be the working device described in the preceding aspects.

The self-driving working machine may be an electrically driven self-driving working machine. The self-driving working machine may comprise at least one of a battery-powered drive system, a fuel cell-powered drive system and a conventional drive system. According to an embodiment, the self-driving working machine comprises a first drive system for driving the working device and a second drive system for longitudinal dynamics driving of the self-driving working machine. The second drive system can be controlled independently of the first drive system with the control device.

FIG. 1 shows a self-driving working machine 100 according to an embodiment having a control device 20 for operating the self-driving working machine 100 according to an embodiment.

The self-driving working machine 100 comprises a working device 10 for performing a task. The working device 10 is arranged on the self-driving working machine 100. The self-driving working machine 100 also comprises a drive train 30 for driving the self-driving working machine 100. The self-driving working machine 100 comprises a first drive system 12 for driving the working device 10 and a second drive system 32 for driving the drive train 30. According to an embodiment, both drive systems 12, 32 are electric drive systems which are supplied with energy by at least one battery.

The control device 20 is set up to control both drive systems 12, 32. The control device 20 is thus also set up to control the working device 10 and the drive train 30 by means of the two drive systems 12, 32.

The control device 20 comprises an evaluation unit 22, which is set up to determine an operating variable of the working device 10. According to an embodiment, the evaluation unit 22 is set up to determine a position of the working device 10 relative to a frame of the self-driving working machine 100 based on a measurement variable that has been read out. The evaluation unit 22 is also set up to determine a longitudinal dynamics driving variable of the self-driving working machine 100. According to an embodiment, the evaluation unit 22 is set up to determine an acceleration request of a driver based on an acceleration signal that has been read out.

The control device 20 comprises a checking unit 24, which is set up to check whether a hazardous state for the stability of the self-driving working machine 100 can arise based on the operating variable determined with the evaluation unit 22 and the longitudinal dynamics driving variable also determined with the evaluation unit 22. According to an embodiment, the checking unit 24 is set up to check whether, based on the relative position of the working device 10 and the acceleration request of the driver, a tilting state of the self-driving working machine 100 can arise when accelerating the self-driving working machine 100. The checking unit 24 is also set up to provide a check result based on the check, wherein the check result according to an embodiment is the presence or absence of a tilting state during an acceleration of the self-driving working machine 100 requested by the driver.

The control device 20 comprises an interface 26 for outputting a control signal. With the control signal an intervention in the longitudinal dynamics of the self-driving working machine 100 is carried out depending on the check result that can be provided by the checking unit 24. According to an embodiment, in the presence of a tilting state, an intervention is carried out into the drive train 30 of the self-driving working machine 100 in such a way that regardless of the acceleration requested by the driver, only a reduced acceleration of the self-driving working machine 100 is permitted and implemented to avoid tilting of the self-driving working machine 100.

Figure 2:
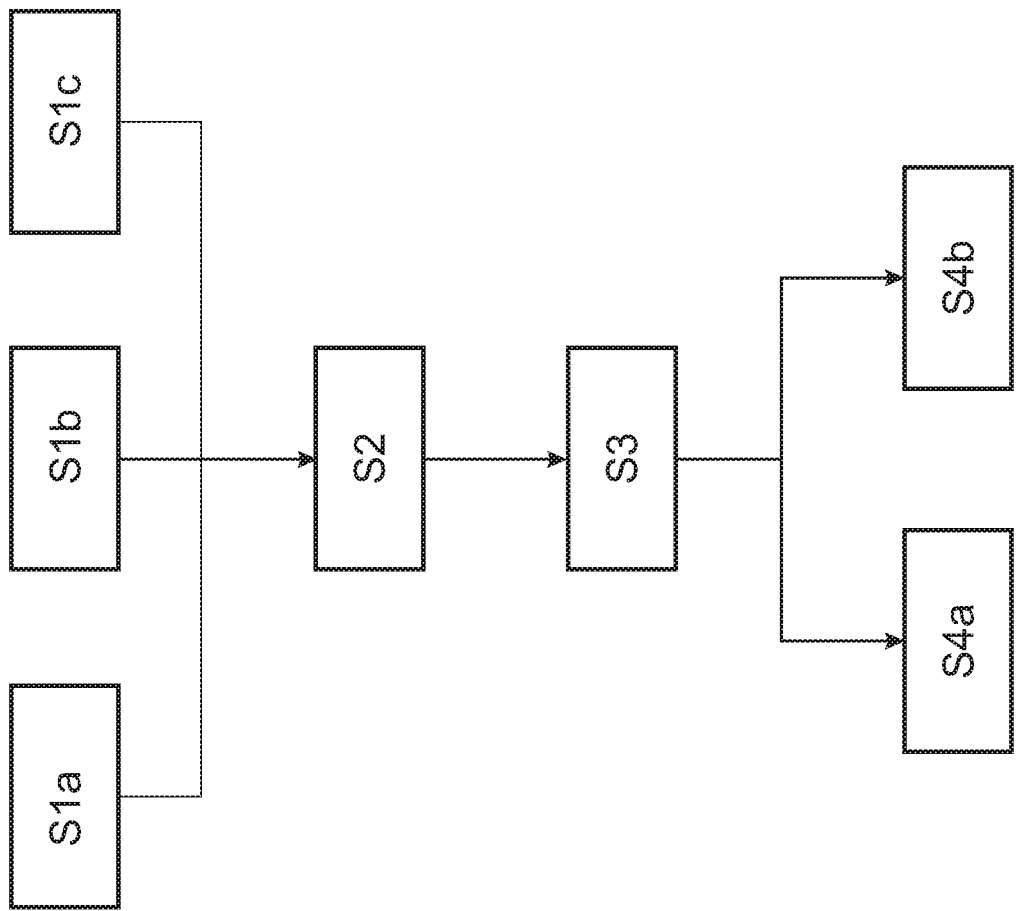
FIG. 2 illustrates a schematic flowchart with steps of a method for operating a self-driving working machine according to an embodiment of the invention.

FIG. 2 shows a flowchart with steps S1a to S4b of a method for operating the self-driving working machine 100 shown schematically in FIG. 1.

In a step S1a, an operating variable determination is carried out. The operating variable of the working device 10 of the self-driving working machine 100 is determined here. The step S1a is carried out by the control device 20 as described. In a further step S1b, a driving variable determination is carried out parallel with step S1a. The longitudinal dynamics driving variable of the self-driving working machine 100 is determined here. The step S1b is carried out by the control device 20 as described.

In an optional further step S1c, determination of the orientation of the self-driving working machine 100 is also carried out in parallel with the steps S1a, S1b. The current orientation of the self-driving working machine 100 is determined by the control device 20 here. The step S1c is carried out by the control device 20 based on information that has been read out about an inclination of the self-driving working machine 100. This is information about a longitudinal inclination of the self-driving working machine 100. Alternatively or additionally, it is information about a transverse inclination of the self-driving working machine 100.

In a further step S2, a stability check is carried out. Here, the checking unit 24 of the control device 20 checks whether a hazardous state for the stability of the self-driving working machine 100 can arise, based on the operating variable determined in step S1a and the longitudinal dynamics driving variable determined in step S1b. Optionally, the step S2 is also performed based on the orientation determination carried out in step S1c. Step S2 is also carried out by the control device 20 as described.

In a further step S3, a longitudinal dynamics intervention is performed. This is performed in the longitudinal dynamics of the self-driving working machine 100 depending on the check result based on step S2, which is in the form described.

After step S3, a task operating variable implementation is carried out. A maximum task operating variable requested by the driver for performing a task with the working device 10 is implemented here. Based on step S3, an implementation of the maximum task operating variable is only possible without risking the stability of the self-driving working machine 100. According to an embodiment, the position of the working device 10 can be changed at maximum speed, for example the working device 10 can be raised at maximum speed. However, based on step S3 the self-driving working machine 100 can only be accelerated here with reduced aggressiveness or can be reversed according to an embodiment.

According to a further optional step S4b, a braking implementation is carried out. Here, maximum braking of the self-driving working machine 100 triggered by the driver is implemented to trigger an emergency braking process independently of step S3. The operational safety of the self-driving working machine 100 can thus be ensured independently of step S3.

While subject matter of the present disclosure has been illustrated and described in detail in the drawings and foregoing description, such illustration and description are to be considered illustrative or exemplary and not restrictive. Any statement made herein characterizing the invention is also to be considered illustrative or exemplary and not restrictive as the invention is defined by the claims. It will be understood that changes and modifications may be made, by those of ordinary skill in the art, within the scope of the following claims, which may include any combination of features from different embodiments described above.

The terms used in the claims should be construed to have the broadest reasonable interpretation consistent with the foregoing description. For example, the use of the article "a" or "the" in introducing an element should not be interpreted as being exclusive of a plurality of elements. Likewise, the recitation of "or" should be interpreted as being inclusive, such that the recitation of "A or B" is not exclusive of "A and B," unless it is clear from the context or the foregoing description that only one of A and B is intended. Further, the recitation of "at least one of A, B and C" should be interpreted as one or more of a group of elements consisting of A, B and C, and should not be interpreted as requiring at least one of each of the listed elements A, B and C, regardless of whether A, B and C are related as categories or otherwise. Moreover, the recitation of "A, B and/or C" or "at least one of A, B or C" should be interpreted as including any singular entity from the listed elements, e.g., A, any subset from the listed elements, e.g., A and B, or the entire list of elements A, B and C.

REFERENCE SIGNS 10 working device
12 first drive system
20 control device
22 evaluation unit
24 checking unit
26 interface
30 drive train 32 second drive system
100 self-driving working machine
S1a operating variable determination
S1b driving variable determination
S1c orientation determination
S2 stability checking
S3 longitudinal dynamics intervention
S4a task operating variable implementation
S4b braking implementation

The invention claimed is:

1. A method for operating a self-driving working machine comprising:
  determining an operating variable of a working device of the self-driving working machine by determining that a task hydraulic request requested by an automatic system for automatically performing a task with the working device exceeds a predefined threshold communicated by the automatic system, wherein the operating variable includes a current operating state of the working device, and wherein determining the operating variable of the working device includes a query as to whether the automatic system is activated;
  determining a longitudinal dynamics driving variable of the self-driving working machine;
  checking whether a hazardous state for stability of the self-driving working machine can occur based on the determined operating variable and the determined longitudinal dynamics driving variable; and
  intervening in longitudinal dynamics of the self-driving working machine depending on a check result based on the checking step.

2. The method as claimed in claim 1, wherein the step of determining the operating variable of the working device includes a determination of a task hydraulic request requested by a driver for performing a task with the working device.

3. The method as claimed in claim 1, wherein the step of determining the operating variable of the working device includes a determination of a load acting on the working device.

4. The method as claimed in claim 1, wherein the step of determining the operating variable of the working device involves a determination of spatial location information for the working device.

5. The method as claimed in claim 1, wherein the working device comprises a lifting frame, and
  wherein the step of determining the operating variable of the working device involves determining a working variable of lifting kinematics of the lifting frame.

6. The method as claimed in claim 1, wherein the step of determining the longitudinal dynamics driving variable includes a determination of a drive request requested by a driver for longitudinally dynamic driving of the self-driving working machine.

7. The method as claimed in claim 1, wherein the step of determining the longitudinal dynamics driving variable includes a determination of a change of direction of travel requested by a driver to change a direction of travel of the self-driving working machine.

8. The method as claimed in claim 1, wherein the checking step includes a check of whether a tilting state of the self-driving working machine can arise.

9. The method as claimed in claim 1, further comprising determining information about a spatial orientation of the self-driving working machine,
  wherein the checking step is carried out based on the determined information about the spatial orientation of the self-driving working machine.

10. The method as claimed in claim 1, wherein the step of intervening in the longitudinal dynamics includes limiting a drive request that can be requested by a driver to drive the self-driving working machine.

11. The method as claimed in claim 1, further comprising implementing a maximum task operating variable requested by a driver for performing a task with the working device.

12. The method as claimed in claim 1, further comprising implementing maximum braking of the self-driving working machine triggered by a driver to trigger an emergency braking process.

13. The method as claimed in claim 1, wherein the checking step includes a determination of a current hazardous state or a prediction of a future hazardous state for the self-driving working machine.

14. The method as claimed in claim 1, wherein the step of intervening in the longitudinal dynamics includes control of a drive motor for a longitudinal dynamics drive of the self-driving working machine or a drive train of the self-driving working machine.

15. A controller for operating a self-driving working machine, the controller comprising:
  an evaluator for determining an operating variable of a working device of the self-driving working machine by determining that a task hydraulic requested by an automatic system for automatically performing a task with the working device exceeds a predefined threshold communicated by the automatic system and for determining a longitudinal dynamics driving variable of the self-driving working machine, wherein the operating variable includes current operating state of the working device, and wherein determining the operating variable of the working device includes a query as to whether the automatic system is activated;
  a checker for checking whether a hazardous state for stability of the self-driving working machine can arise based on the determined operating variable and the determined longitudinal dynamics driving variable,
  wherein the checker is set up to provide a check result based on the check; and
  an interface for outputting a control signal with which an intervention into longitudinal dynamics of the self-driving working machine can be carried out depending on a check result that can be provided by the checker.

16. A self-driving working machine comprising the controller according to claim 15 and a working device.

17. The self-driving working machine according to claim 16, further comprising:
  a first drive system for driving the working device; and
  a second drive system for longitudinally dynamic driving of the self-driving working machine,
  wherein the second drive system can be controlled with the controller independently of the first drive system.

* * * * *